United States Patent Office 2,775,603
Patented Dec. 25, 1956

1

2,775,603

CYCLIZATION PROCESS

John C. Sheehan, Arlington, Mass.

No Drawing. Application October 2, 1953,
Serial No. 383,914

5 Claims. (Cl. 260—397.4)

The present invention relates to cyclization of organic compounds, particularly to the closure of rings in the formation of steroids.

Published methods leading to the total syntheses of equilenin and estrone commonly feature a closure of the "D" ring via the Dieckmann condensation. For example, a carbon atom is first added to the aliphatic acid chain of dimethyl marrianolate methyl ether (I) and subsequently lost upon formation of ring "D" as shown below in the preparation of estrone (II):

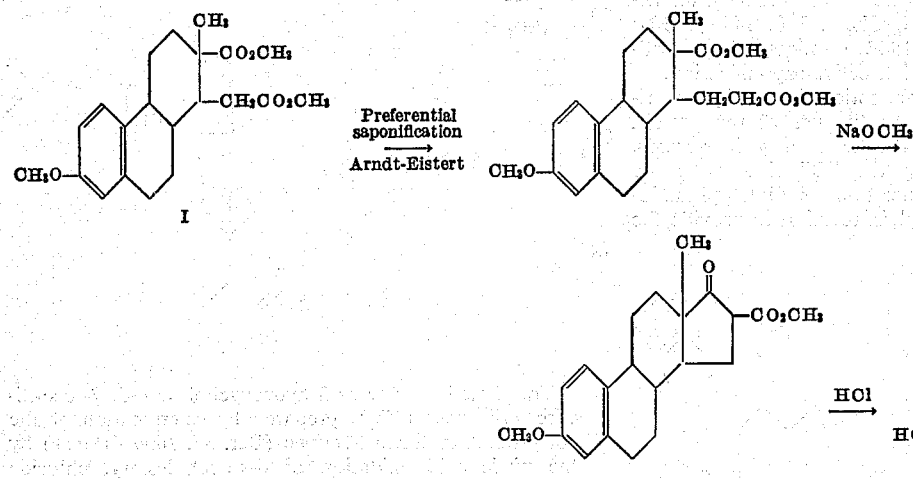

The acyloin condensation would offer advantage in carrying out ring formations of the above type, particularly in that it would avoid the essentially wasteful homologation steps and the loss of carbon atoms in closing the ring.

For the most part the acyloin condensation has been carried out in heterogeneous media, suspending finely divided sodium in solvents such as xylene, toluene, and the like. Diesters susch as diethyl pimelate have been cyclized using a ratio of 4 atoms of sodium to one mole of diester. Vigorous stirring and an inert atmosphere are also required. Very good yields are obtained in the preparation of relatively large aliphatic rings using ordinary procedures. However, with smaller rings, and especially where the diester contains bulky components such as aryl groups, special care such as high-dilution addition of the diester over a long period of time is mandatory. Even then only a low yield of acyloin is obtained.

Recently it has been found that the acyloin condensation can be carried out in homogeneous media. Ethyl adipate has been cyclized to a six-membered acyloin using sodium in homogeneous liquid ammonia solution.

It has now been found that the acyloin condensation may be carried out in homogeneous media to effect the closure of the A, B, C and D rings (designated in II below) in the synthesis of steroids such as estrone (II),

2 equilenin (III), estradiol (IV), estriol (V), and the like. For example, dimethyl marrianolate

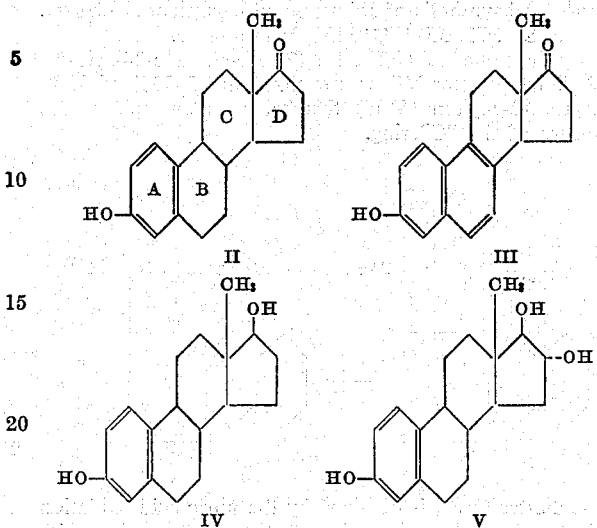

methyl ether (I) may be cyclized to give a single isomer 16-keto-17β-estradiol-3-methyl ether (VI) in 96% yield.

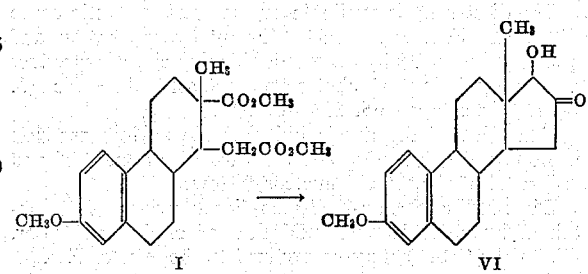

Attempted cyclization of this diester in the heterogeneous medium of sodium in boiling toluene was not successful. After high-dilution addition of the diester during six hours and a total heating period of 16 hours no cyclic acyloin or other cyclization products could be identified from the reaction mixture. 40% of the diester, the starting material, was recovered unchanged. The only other material isolated was insoluble polymeric material.

By contrast, when the dimethyl marrianolate methyl ether was treated with an excess of sodium in a reaction medium of 60% liquid ammonia and 40% anhydrous ether, adding the diester in either solution during one hour, the reaction was very rapid, the rate of diester addition had little or no effect and the isolation of the 16-keto-17β-estradiol-3-methyl ether was effected readily in the aforementioned 96% yield. The dimethyl marrianolate methyl ether can be prepared by the relatively short total synthesis of Johnson and Christiansen (J. Am. Chem. Soc. 73, 5511 (1951)) from anisole.

By the same technique, 11, 12-seco-cholane-24-acid-11, 12 dimethyl ester VII was cyclized in 75–80% yield to an 11, 12-acyloin (VIII) this being an example of the closure of the "C" ring.

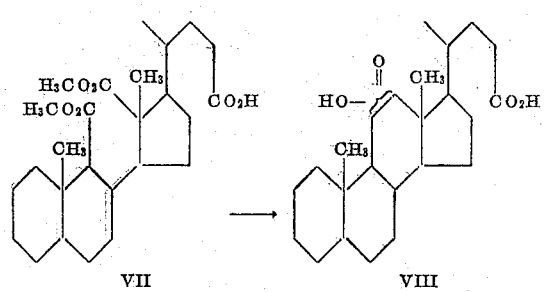

The diester (VII) is obtained by the nitric acid oxidation of 12-hydroxycholanic acid or by the chromic acid oxidation of an 11,12-acyloin mixture to 11, 12-seco-cholane-11, 12, 24-triacid (Z. Physiol. Chem. 110, 141 (1920); Helv. Chim. Acta. 25, 816 (1942)) followed by esterification with diazomethane and selective saponification.

The cyclization of the aforementioned dimethyl marrianolate methyl ether illustrates the use of the present invention in the formation of the "D" ring of the steroids. Another example of closing the "D" ring using the present invention is the cyclization of dimethyl aetioallobilianate (IX) via the acyloin reaction to provide the α-ketol (X).

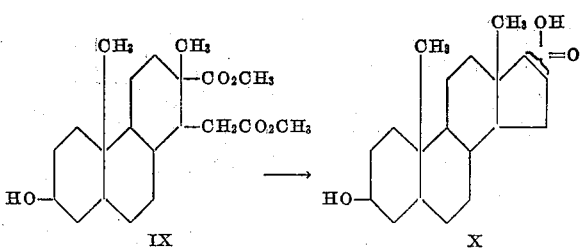

The diester IX is available by the total synthetic route (J. Chem. Soc. 361 (1953)) or by hydrogenation and esterification of 3β-hydroxyaetiobilienic acid, a byproduct of the oxidation of cholesteryl acetate dibromide (J. Pharm. Soc. Japan 65, 631 (1936)).

Examples of the applicability of the acyloin reaction in homogeneous media to the formation of the "A" and "B" rings of the steroid nucleus follow:

Dimethyl cholestan-2, 3-seco-dicarboxylate (XI) obtained by chromic acid oxidation of cholestanol (Ber. 47, 2384 (1914)) may be cyclized to the α-ketol XII.

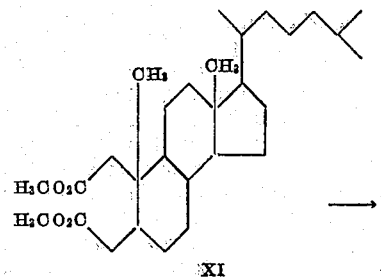

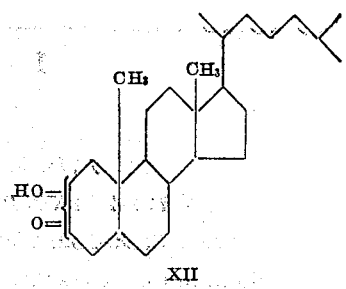

Dimethyl cholestan-3, 4-seco-dicarboxylate (XIII) described in Helv. Chim. Acta. 25, 1434 (1942) and prepared from cholestanone by perbenzoic acid oxidation, hydrolysis of the resultant lactone, esterification of the carboxyl group, oxidation of the hydroxyester to a half ester followed by complete esterification may be cyclized to the α-ketol XIV.

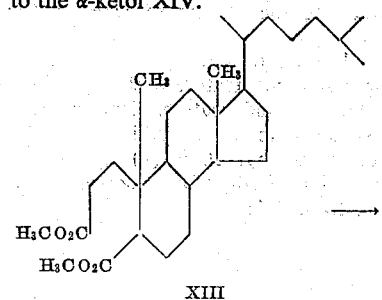

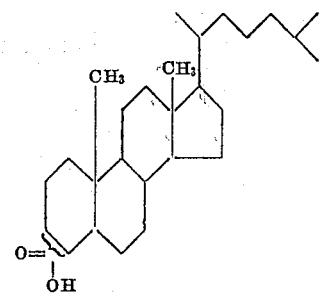

The dimethyl ester of 3-hydroxycholastan-6, 7-seco-dicarboxylic acid (XV), prepared by esterification of the corresponding diacid obtained (Ber. 37, 3699 (1904)) by the nitric acid oxidation of 6-ketocholesteryl chloride followed by hydrolysis of the 3-chloro substituent may be cyclized to the α-ketol XVI.

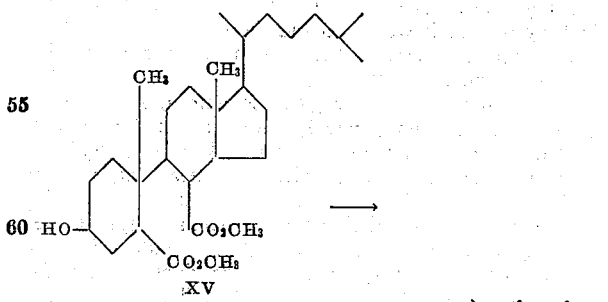

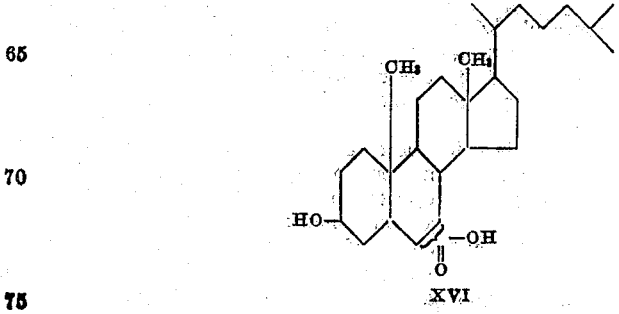

A detailed example of the manner in which the process of the present invention may be employed to effect ring closures in the preparation of steroids is set forth below:

*16-keto-17β-estradiol-3-methyl ether (II)*.—To a 1 l. three-necked flask fitted with a Dry Ice condenser, stirrer, addition funnel, and nitrogen system was added 200 ml. of dry ether and 300 ml. of anhydrous liquid ammonia. In this liquid was dissolved 0.80 g. (0.0348 g.-atom) of freshly-cut sodium. The system was swept thoroughly with prepurified nitrogen and all subsequent operations up to the extractions were carried out under a slow stream of nitrogen. A solution of 1.82 g. (0.005 mole) of dimethyl marrianolate methyl ether in 180 ml. of dry ether was added during 1½ hours with efficient stirring, and the stirring was continued as the flask was allowed to come slowly to room temperature. After 4 hours only a trace of ammonia could be detected in the exit gases. To the white suspension of excess sodium and sodium enolate of acyloin in ether was added 2 ml. of methanol in 100 ml. ether (to destroy excess sodium) and the mixture was acidified with 50 ml. of 5% hydrochloric acid. After partition and separation, the aqueous layer was extracted with an ether-methylene chloride mixture, and the combined organic solution was washed with dilute sodium bicarbonate and water. Removal of the solvents under reduced pressure afforded 1.44 g. (96%) of colorless crystalline product, M. P. 163–166°; $[\alpha]_D^{25} = -85°$ ($c=1$ in ethanol). Treatment with charcoal and recrystallization from aqueous acetone gave silky needles of 16-keto-17β-estradiol-3-methyl ether (VI), M. P. 169.5–171°; $[\alpha]_D^{27} = -87°$ ($c=1$ in ethanol).

*Anal.*—Calcd. for $C_{19}H_{24}O_2$: C, 75.97; H, 8.05. Found: C, 75.79; H, 8.09.

Upon admixture with a sample of 16-keto-17β-estradiol-3-methyl ether, M. P. 169–170.5°; $[\alpha]_D^{27} = -88°$ ($c=1$ in ethanol), prepared from 16-oximinoestrone methyl ether according to the method of Butenandt (Z. Naturforchung 1, 82 (1946)), the M. P. was 169–170.5° (undepressed).

A sample of VI prepared by the acyloin cyclization was converted to an oxime derivative. After three recrystallizations from ethanol the M. P. (dec., in bath at 194°) was 199.5–200°.

*Anal.*—Calcd. for $C_{19}H_{25}O_3N$: C, 72.35; H, 8.00. Found: C, 72:39; H, 8.21.

Generally, in carrying out the reaction 4 atoms of sodium are employed for each mole of the diester which is condensed. Excess sodium may be employed if desired and in many cases is beneficial. In addition to sodium it is also possible to employ other alkali metals such as potassium, although from a practical standpoint sodium is preferred because of its greater availability, cost and ease of handling.

Other solvents besides liquid ammonia may be employed to dissolve the alkali metal such as sodium or potassium, such other solvents being anhydrous methylamine and anhydrous hydrazine. Other solvents for the seco-steroid diester which may be employed instead of ether as mentioned above include tetrahydrofuran and the dimethyl ether of ethylene glycol.

Experiments indicate that the temperatures at which the reaction may be carried out are not critical. Generally, it is preferred to carry out the reaction at near room temperatures. In the case where liquid ammonia is used it is most convenient to carry out the reaction at a temperature of about −35° C., the boiling point of the ammonia. Where the ammonia is replaced by anhydrous methylamine as a solvent for the alkali metal the temperature more conveniently employed is of the order of −10° C. Higher temperatures may be employed with anhydrous hydrazine as the solvent for the alkali metal.

It will be understood that the details set forth above are by way of example only and that various procedural modifications within the spirit of the invention will occur to those skilled in the art. Accordingly, reference should be had to the appended claims for a definition of the limits of the present invention.

What is claimed is:

1. In the acyloin condensation of a seco-steroid diester to form a steroid ring, the improvement comprising carrying out said cyclization with sodium in a homogeneous medium.

2. In the acyloin condensation of a seco-steroid diester to form a steroid ring, the improvement comprising carrying out said cyclization with sodium dissolved in liquid ammonia.

3. In the acyloin condensation of a seco-steroid diester to form a steroid ring, the improvement comprising carrying out said cyclization with sodium dissolved in liquid ammonia and diethyl ether.

4. The process of producing 16-keto-17β-estradiol-3-methyl ether which comprises effecting the acyloin condensation of dimethyl marrianolate methyl ether with sodium in liquid ammonia and diethyl ether.

5. In the acyloin condensation of a seco-steroid diester to form a steroid ring, the improvement comprising carrying out said cyclization with alkali metal in a homogeneous medium.

References Cited in the file of this patent

UNITED STATES PATENTS

| | | |
|---|---|---|
| 2,275,752 | Goldberg | Mar. 10, 1942 |

FOREIGN PATENTS

| | | |
|---|---|---|
| 266,510 | Switzerland | July 1, 1950 |
| 288,314 | Switzerland | May 16, 1953 |
| 514,516 | Great Britain | Nov. 10, 1939 |